June 10, 1952     D. H. PRUTTON     2,600,022
TAPPING MACHINE DRIVE

Filed June 16, 1948     3 Sheets-Sheet 1

INVENTOR
DANIEL H. PRUTTON
BY Hyde, Meyer, Baldwin & Doran
ATTORNEYS

June 10, 1952
D. H. PRUTTON
2,600,022
TAPPING MACHINE DRIVE
Filed June 16, 1948
3 Sheets-Sheet 2
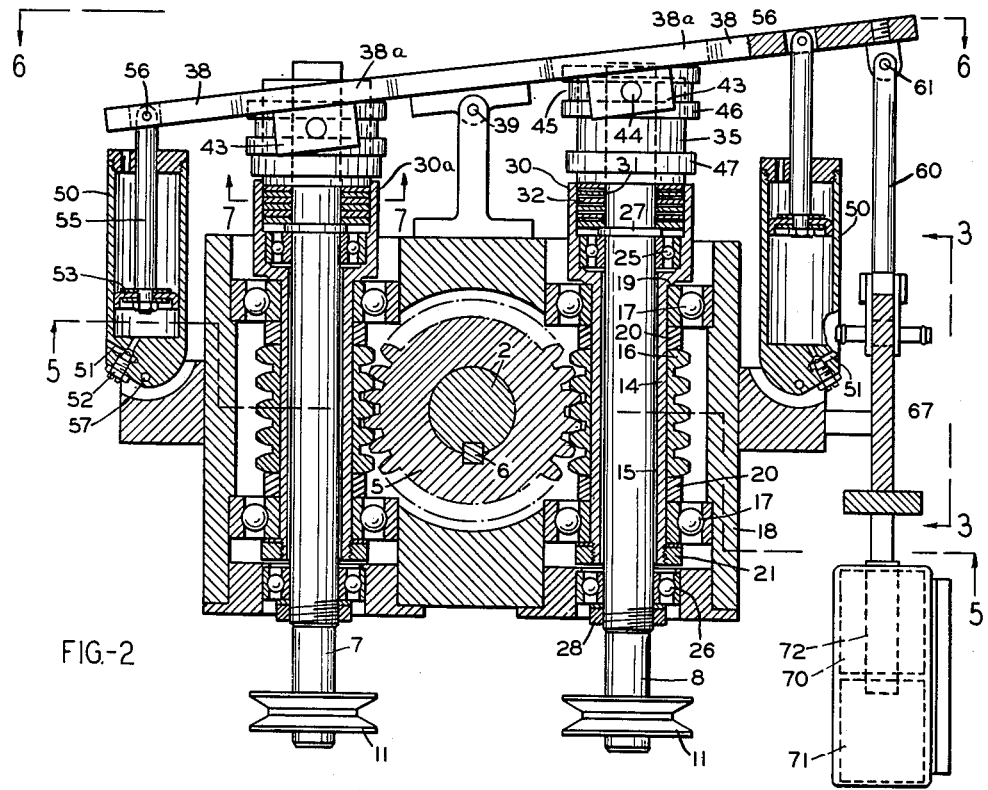
FIG.-2
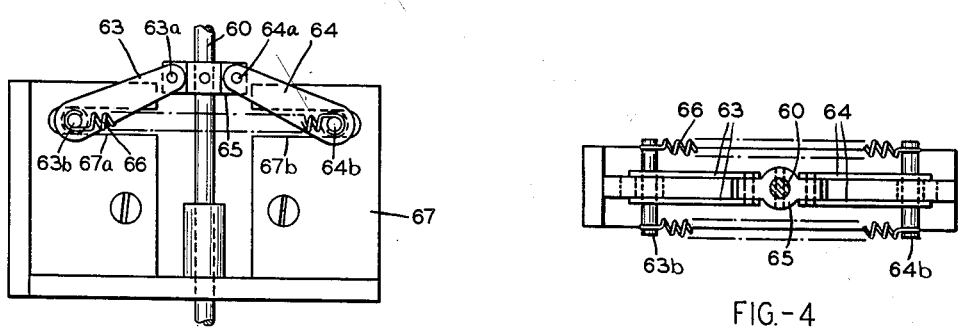
FIG.-3
FIG.-4
INVENTOR
DANIEL H. PRUTTON
BY Hyde, Meyer, Baldwin & Doran
ATTORNEYS June 10, 1952        D. H. PRUTTON        2,600,022

TAPPING MACHINE DRIVE

Filed June 16, 1948        3 Sheets-Sheet 3

INVENTOR
DANIEL H. PRUTTON
BY Hyde, Meyer, Baldwin & Doran
ATTORNEYS

Patented June 10, 1952

2,600,022

UNITED STATES PATENT OFFICE 2,600,022

TAPPING MACHINE DRIVE

Daniel H. Prutton, Cleveland, Ohio

Application June 16, 1948, Serial No. 33,393

2 Claims. (Cl. 74—322)

The invention relates to reversible driving mechanism for a machine element such as a spindle, plunger, shaft or the like. While adaptable to a variety of applications, it will be illustrated and described with reference to a tap-holding spindle in an automatic tapping machine.

The present invention constitutes an improvement on the mechanism illustrated, described, and claimed in my copending application for Machine Structures, Serial No. 587,398, filed April 9, 1945, now Patent No. 2,501,733.

The said copending application discloses a reciprocating, tool-holding spindle, means for controlling the reciprocation of the spindle, means for rotating the spindle, and means for reversing the direction of axial travel and peripheral rotation of the spindle. Said copending application also discloses cushioning means for absorbing sudden or unexpected resistance to tool travel, so as to prevent breakage or injury to the machine or the tool.

An object of the invention is to provide novel and improved driving means for a reciprocable and reversible machine element.

Another object of the invention is to provide reciprocating and rotating tool holding mechanism, the direction of axial travel and of rotation being reversible and automatically responsive to tool travel, the driving power being supplied by a continuously rotating, non-reversing motor.

A further object of the invention is to provide a tool holding spindle, a ring gear on said spindle, a pair of spaced continuously rotatable driving shafts each carrying a worm in engagement with diametrically opposed portions of said gear, clutch means for establishing or terminating driving engagement between each said shaft and its respective worm and for simultaneously causing either shaft to rotate idly while the other is in driving engagement with its respective worm and consequently with the gear and spindle, means responsive to spindle position for producing alternations in clutch engagement, the relative orientation in worm threads of the two worms being such that each alternation in clutch engagement produces a reversal in direction of spindle rotation although the driving shafts are running in the same direction.

A further object is to provide in a mechanism of the type defined in the last preceding paragraph, means for maintaining one or the other of the engaged clutch members in tight working engagement.

Further and more specific objects and advantages will be apparent from a study of the following specification, in conjunction with the accompanying drawings, in which Fig. 1 is a view in side elevation of a tapping machine incorporating my invention.

Fig. 2 is a sectional view taken on the line 2—2 of Fig. 1.

Fig. 3 is a detail side elevational view taken approximately from the position of the line 3—3 of Fig. 2.

Fig. 4 is a plan view taken from above Fig. 3.

Figure 7:
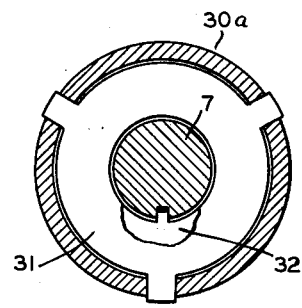
Figure 5:
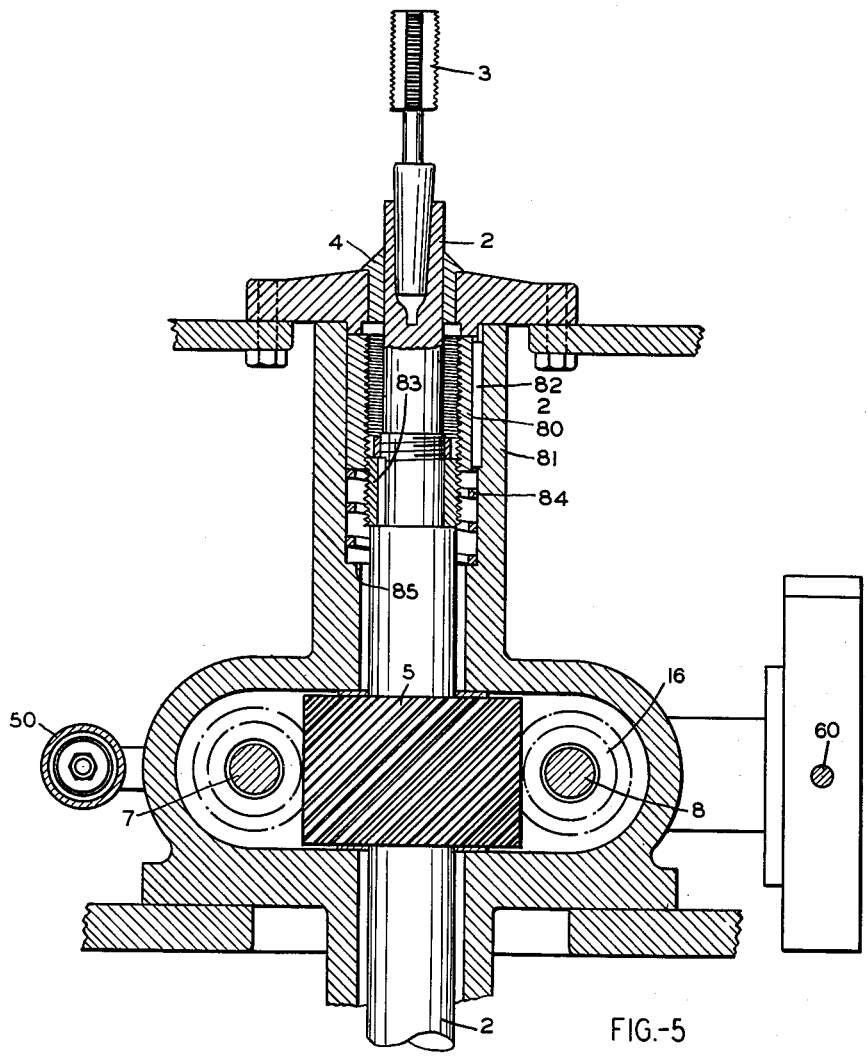
Figure 6:
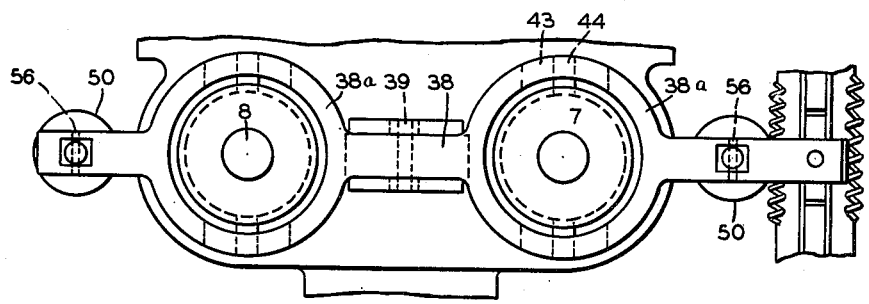

Figs. 5, 6 and 7 are sectional views taken on the lines 5—5, 6—6, and 7—7 respectively of Fig. 2.

Figure 8:
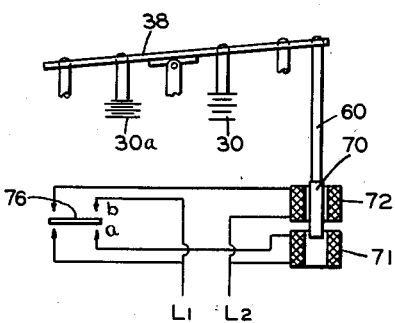

Fig. 8 is a view showing, schematically and diagrammatically, a wiring diagram and associated controls for the machine.

Since it will be immediately apparent that the invention is applicable to use in a variety of machining, boring, metal cutting, or grinding operations, it need not be further emphasized that the present description and accompanying drawings are entirely by way of example, and represent only one application of the invention.

My invention will be illustrated and described with reference to a machining operation requiring axial reciprocation of tool carrying means, and peripheral rotation of the same means. A tapping operation as hereinafter described is well illustrative of such combination of movements, since the tool-carrying spindle is advanced and withdrawn, while the tool rotates and reverses in synchronism with the axial travel. In machines embodying adaptions of such reversible mechanical movements, and traveling at relatively high speeds, a problem arises in the elimination of inertia shock to moving parts arising from rapid reversals. In the present invention I have provided a driving motive force in the form of a motor which runs continuously in one direction, and which drives a pair of shafts, both shafts likewise rotating in the same direction. The tool is carried on a spindle which has a ring gear associated therewith. Each of the shafts has a worm thereon operatively engaging the ring gear at respectively opposed positions. Driving engagement between each worm and its shaft is effected by means of a clutch. Only one clutch is engaged at any one time, so that the spindle is responsive, at any instant in a work cycle, only to one driving shaft. Although both driving shafts are running in the same direction, the worm thread orientation is such that when one clutch is engaged the spindle rotates in one direction and when the other clutch is engaged the spindle rotates in the other direction.

Figure 1:
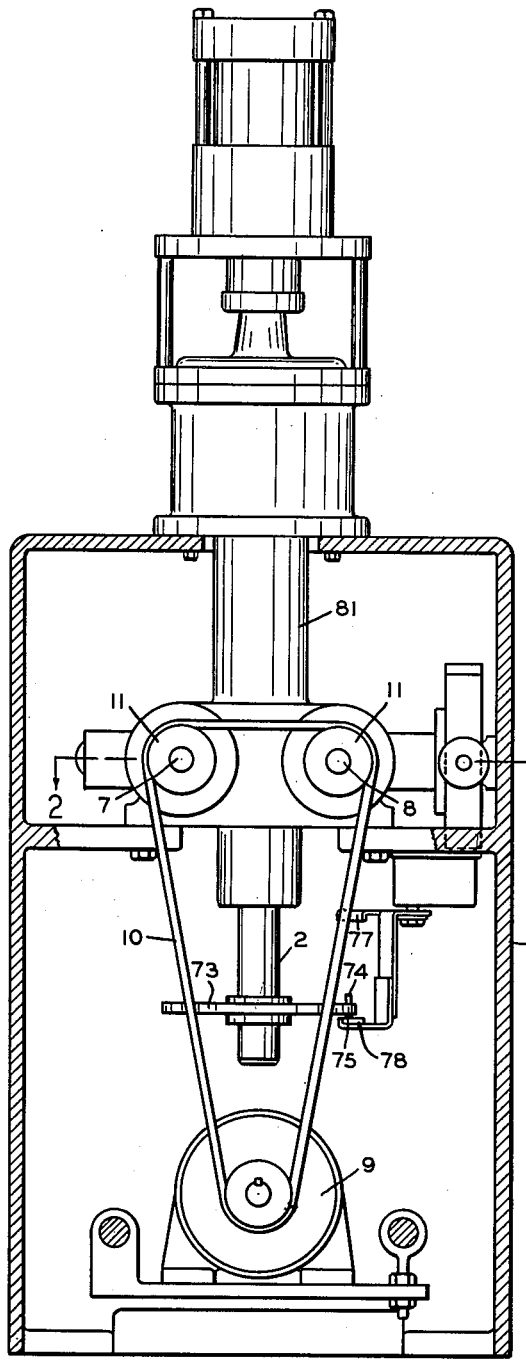

Referring now to the drawings, there is shown a frame 1 which carries a rotatable spindle 2 having at one end thereof a tap 3. A number of structural features are similar to those shown in my copending application, Serial No. 587,398, filed April 9, 1945. The spindle is maintained in axial alignment in bearings 4, and is axially slidable in the central bore of a ring gear 5 which is rotatable with the spindle, being keyed thereto by a key 6 (Fig. 2). A pair of driving shafts 7 and 8 are disposed one on each side of spindle 2, the shafts being rotatable from a motor 9 (Fig. 1) by means of a V belt 10 which engages sheaves 11 fixed to the shaft ends. The operating linkages whereby driving force is applied to spindle 2 from both driving shafts are identical, and description of one such linkage will suffice.

A generally cylindrical sleeve 14 (Fig. 2) is telescopingly receivable on shaft 8, there being sufficient annular clearance 15 therebetween to permit relative rotation between sleeve and shaft when said sleeve and shaft are not in operating engagement. Fixed to sleeve 14 is a worm 16 which turns with the sleeve and which engages the teeth of gear 5. The pitch and lead of the teeth and thread of the gears and worm are such that the arrangement is reversible, that is to say the gear can drive the worms, and the worms can drive the gear, the terms "worm" and "gear" being here used for convenience. The sleeve is rotatable in bearings 17 in a housing 18 which is fixed with respect to the frame. The sleeve is outwardly enlarged at one end to provide a shoulder 19 against which the worm 16, a pair of spacer rings 20, and the bearings 17 are all retained in proper relationship by a threaded retaining nut 21. The shaft 8 is independently rotatably supported at one end in a bearing 25 within the enlarged sleeve part, and at the other end in a bearing 26 carried in housing 18 outwardly beyond the sleeve end. Bearing 25 is backed up against a flange 27 on shaft 15, and the assembly composed of sleeve 14 and bearing 26 is retained by a threaded retaining nut 28 on the shaft.

Driving relationship between shaft 8 and worm 16 through sleeve 14 is effected or interrupted by means of a disk clutch 30, having alternate disks 31 and 32 keyed respectively to sleeve 14 and shaft 8. It will be obvious that inward pressure on the disk assembly transmits driving torque from sleeve 14 to shaft 8, and that release of such pressure permits the shaft and sleeve to be rotated independently of each other. A pressure sleeve 35 is slidable endwise on the shaft and is adapted to apply pressure to the outer clutch disk, or release such pressure, so as to engage or disengage the clutch.

The clutches 30 and 30a are operated simultaneously, but when one is engaged the other is disengaged. This is accomplished by means of a rocker arm 38 movable on a pivot 39 which is fixed on the housing between the ends of shafts 7 and 8.

As previously indicated, pressure sleeve 35 slides on shaft 8 to engage the clutch disks when the sleeve is moved inwardly. Rocker arm 38 is provided with ring portions 38a concentric with shafts 7 and 8. Depending from rings 38a at diametrically opposed points are blocks 43 having inwardly extending pins 44. The pins are receivable in a groove 45 in an operating collar 46 slidable on pressure sleeve 35. It will be apparent that if the right end of arm 38 (Fig. 2) is moved downwardly, pin 44 pulls collar 46 against shoulder 47 on pressure sleeve 35 so as to bring pressure against the clutch disks and establish driving relationship between shaft 8 and sleeve 14.

When desired, the rate of reversal of the rocker arm can be controlled in the following manner. Near the ends of the arm 38 are a pair of dash pot cylinders 50 each having an outlet vent 51, the clear aperture of which can be controlled by a needle valve 52. Pistons 53 within the dash pots are connected to arm 38 by connecting rods 55 at pivot joints 56. The dash pots are pivotally mounted at 57 to prevent jamming of the pistons.

Actual clutch reversal is effected by means of an operating rod 60 pivotally connected at 61 to the end of rocker arm 38. The rod 60 is operated at significant points in the work cycle by electrical means hereinafter to be described.

Maintaining means is provided for keeping one or other clutch in firm engagement, and for avoiding a "neutral" position such that neither clutch is engaged. These purposes are effected by providing the over-center, spring biased toggle arrangement carried by operating rod 60, and best shown in Figs. 2, 3 and 4. The toggle arms 63 and 64 extend away from rod 60 in opposed directions, being pivoted at 63a and 64a to a bracket 65 fixed to the rod. The outer ends of arms 63 and 64 carry transverse end pins 63b and 64b which are tied by helical tension springs 66. The pins 63b and 64b are slidable in grooves 67a and 67b in a plate 67 attached to the machine frame. It will be apparent that movement of rod 60, to carry the toggle arms 63 and 64 past center, causes increased tension on springs 66, the normal bias of the springs, exerted through the arms 63 and 64 having the tendency to urge rod 60 away from center in one direction or the other. The arrangement is such that at dead center, both clutches are just disengaged, and when the rod is moved slightly past such dead center one clutch is tightly engaged.

A simple electrical hookup can be devised to effect alternate engagement of the clutches 30 and 30a. One such arrangement is illustrated in schematic and diagrammatic form in Fig. 8. As there indicated, the operating rod 60 is provided with an armature portion 70 which is responsive to energization either of solenoid 71 or 72. Alternate energization of the solenoids is effected as follows. Spindle 2 has affixed thereto a disc 73 having upper and lower fingers 74 and 75. A reversing switch 76 fixed adjacent the spindle is provided with a pair of triggers 77 and 78. When spindle 2 and the rotating disk carried thereby reach the prearranged limit of endwise travel in one direction, finger 74 strikes trigger 77, so as to move switch 76 to position "b". This energizes, momentarily, solenoid 72 from electric supply lines L1, L2, and armature 70 moves to the position indicated in Fig. 8, engaging clutch 30a through rod 60 and arm 38, and disengaging clutch 30. This causes reversal of the spindle as herein previously described. When spindle 2 thereafter reaches the limit of endwise travel in the reverse direction finger 75 strikes trigger 78, throwing switch 76 to the "a" position, energizing solenoid 71, so as to move armature 70 and rod 60 downwardly (Fig. 8) thereby disengaging clutch 30a and engaging clutch 30. This completes one cycle of operation.

As will now be understood, especially on consideration of the foregoing description in the last preceding paragraph, reversal of rotation of the spindle and reversal of endwise travel of the spindle are mutually dependent and interrelated, so that reversal of rotation produces a reversal of direction of endwise travel. Likewise, the rotation itself causes the endwise travel as will now be explained, referring particularly to Fig. 5.

An internally threaded sleeve 80 is telescoping slidable within a cylindrical portion 81 of the spindle housing. Rotation of sleeve 80 is prevented by a key 82 seated in mated grooves in the sleeve and the housing. A collar 83 fixed on the spindle is externally threaded to match the internal threads on sleeve 80. It will be apparent that if sleeve 80 were held in fixed position with respect to the housing, and spindle 2 were rotated, the spindle would move endwise in a direction determined by the direction of rotation and the orientation of the engaging threads on the collar 83 and the sleeve 80. In normal operation sleeve 80 is held in place by an abutting helical compression spring 84 of considerable strength, which is backed up against a shoulder 85 fixed with respect to the housing. In the position shown the sleeve 80 is virtually fixed by reason of the strength of spring 84 and endwise travel of the spindle is responsive to direction of spindle rotation.

If an unexpected resistance is encountered by the tap, so that endwise motion of the spindle is prevented or slowed down while the spindle is rotating, sleeve 80 will begin to travel in the opposite direction, against the bias of spring 84.

Under certain conditions, therefore, the collar 83 and sleeve 80 constitute, respectively, a driving member and a driven member. Normally, while the spindle is movable with relation to the fixed sleeve, the driving collar 83 expends its driving force in displacing itself endwise, but, as already indicated, when unexpected resistance is encountered, the driving member is blocked, and produces displacement of the driven member. When and if such condition is encountered the motor labors and slows down, and the situation becomes apparent to the operator who may cut the power off, reverse the tool travel, or otherwise initiate steps to remedy the trouble.

What I claim is:

1. Rotation reversing mechanism for a rotatable spindle, said mechanism comprising a ring gear fixedly mounted on said spindle so as to be rotatable therewith, a pair of generally cylindrical parallel sleeves disposed in spaced relationship, one on each side of and adjacent diametrically opposed sides of said gear, a worm fixed on each sleeve in operative engagement with an adjacent portion of said gear whereby rotation of either said worm produces endwise axial motion of said spindle, a driving shaft freely rotatable with working clearance axially within each said sleeve, a pair of clutches, one clutch on each shaft, each clutch adapted to establish or terminate driving engagement between the shaft and its respective sleeve, driving means operatively engaging each said shaft for producing continuous rotation of both said shafts in the same direction, a rockable lever pivotable at a point between said clutches, and operatively engageable with and effective upon each said clutch whereby rocking movement of said lever to engage one said clutch disengages the other said clutch, the respective worm thread orientations being such that each alternation in clutch engagement produces a reversal of direction of rotational movement of said gear, and consequently of axial movement of said spindle, a solenoid having an armature movable responsive to energization and de-energization of said solenoid, an operating rod linked at one end to said armature and at the other end to said rocking lever, and switch means responsive to contact with said spindle during axial movement of said spindle, and effective upon said solenoid to produce such energization and de-energization.

2. Mechanism as defined in claim 1 wherein the operating rod is provided with snap-action, over-center toggle means, and with spring biasing means effective upon said toggle means to urge the toggle linkage away from center in either direction, whereby to positively maintain said rockable lever in one or other end position of rocking movement, so as to maintain one or other clutch in positive engagement.

DANIEL H. PRUTTON.

REFERENCES CITED

The following references are of record in the file of this patent:

UNITED STATES PATENTS

| Number | Name | Date |
|---|---|---|
| 1,327,497 | Spence | Jan. 6, 1920 |
| 1,907,418 | Westerdahl | May 2, 1933 |
| 2,066,527 | Grisenti | Jan. 5, 1937 |
| 2,165,396 | Mansfield | July 11, 1939 |
| 2,242,293 | Eden | May 20, 1941 |
| 2,253,493 | Bakewell | Aug. 26, 1941 |
| 2,312,115 | Mitchell | Feb. 23, 1943 |
| 2,368,359 | Hellstrom | Jan. 30, 1945 |
| 2,376,917 | Hiltz | May 29, 1945 |

FOREIGN PATENTS

| Number | Country | Date |
|---|---|---|
| 365,248 | Germany | Dec. 12, 1922 |
| 716,760 | France | Oct. 12, 1931 |
| 735,447 | France | Nov. 8, 1932 |